United States Patent [19]
Shiomi et al.

[11] Patent Number: 5,812,573
[45] Date of Patent: Sep. 22, 1998

[54] SEMICONDUCTOR LASERS COMPRISING RARE EARTH METAL-DOPED DIAMOND

[75] Inventors: Hiromu Shiomi; Yoshiki Nishibayashi; Shin-ichi Shikata, all of Itami, Japan

[73] Assignee: Sumitomo Electric Industries, Ltd., Osaka, Japan

[21] Appl. No.: 616,552

[22] Filed: Mar. 15, 1996

[30] Foreign Application Priority Data

Mar. 17, 1995 [JP] Japan .................................. 7-059202

[51] Int. Cl.$^6$ ....................................................... H01S 3/19
[52] U.S. Cl. ................................. 372/44; 372/41; 257/77
[58] Field of Search ................................. 372/43, 45, 41, 372/42, 70, 39, 44; 257/77

[56] References Cited

U.S. PATENT DOCUMENTS

| | | | |
|---|---|---|---|
| 4,638,484 | 1/1987 | Rand et al. ................................ | 372/42 |
| 5,381,755 | 1/1995 | Glesener et al. .......................... | 117/88 |
| 5,420,879 | 5/1995 | Kawarada et al. ........................ | 372/41 |
| 5,434,876 | 7/1995 | Atkins et al. ............................. | 372/31 |
| 5,504,767 | 4/1996 | Jamison et al. ........................... | 372/41 |

FOREIGN PATENT DOCUMENTS

| | | |
|---|---|---|
| 1-74783 | 3/1989 | Japan . |
| 3-227092 | 10/1991 | Japan . |
| 5-291655 | 11/1993 | Japan . |
| 6-216455 | 8/1994 | Japan . |
| 6-219776 | 8/1994 | Japan . |

OTHER PUBLICATIONS

Rand et al, "Visible Color–Center Laser in Diamond", Optics Letters, vol. 10, No. 10, Oct. 1985, pp. 481–483.

Patent Abstracts of Japan, vol. 017, No. 178 (E–1347), Apr. 7, 1993 & JP–A–04 333291 (Agency of IND Science & Technol; Others: 01), Nov. 20, 1992.

Tsang et al, "Observation of Enhanced Single Longitudinal Mode Operation in 1.5 $\mu$m GaInAsP Erbium–Doped Semiconductor Injection Lasers", Applied Phys. Lett., vol. 45, No. 25 Dec. 22, 1986, pp. 1686–1688.

Choyke et al, Intense Erbium–1.54–$\mu$m Photoluminescence From 2 to 525K in Ion–Implaned 4H, 6h, 15R, and 3C SiC, Applied Physics Letters, vol. 65, No. 13, Sep. 26, 1994, pp. 1668–1669.

Wilson et al, "1.54 $\mu$m Photoluminescence from Er–Implanted GaN and AlN", Appl Phys. Letter, vol. 65, No. 8, Aug. 22, 1994, pp. 992–994.

Takahei et al, "Atomic Configuration of the Ef–O Luminescence center in Er–dopoed GaAs With Oxygen Codoping", J. Applied Physics, vol. 76, No. 7, Oct. 1, 1994, pp. 4332–4339.

Rogers et al, "Growth of Er–doped Si Films by Electron Cyclotrom Resonance Plasma Enhanced Chemical Vapor Deposition", J. Vac. Sci. Tehnol A, vol. 12, No. 5, Sep./Oct. 1994, pp. 2762–2766.

Tsang et al, "Observation of Enhacned Single Longitudinal Mode Operation in 1.5 $\mu$m GaInAsP Erbium–Doped Semiconductor Injection Lasers", Appl. Phys. Lett., vol. 49, No. 25, Dec. 22, 1986, pp. 1686–1688.

Ennen et al, "1.54–$\mu$m Electroluminescence of Erbium--Doped Silicon Grown by Molecular Beam Epitaxy", Appl. Phys. Lett., vol. 46, No. 4, Feb. 15, 1995, pp. 381–383.

Ennen et al, "1.54–$\mu$m Luminescence of Erbium–Implanted III–V Semiconductors and Silicon"Appl. Phys. Lett., vol. 43, No. 10, Nov. 15, 1983, pp. 943–945.

Rogers et al, "Erbium–Doped Silicon Films Grown by Plasma–Enhanced Chemical–Vapor Deposition", J. Appl. Phys., vol. 78, No. 10, Nov. 15, 1995, pp. 6241–6248.

Taskin et al, "Sharp 1.54 $\mu$m Luminescence From Porous Erbium Implanted Silicon", Electronics Letters, Nov. 23, 1995, vol. 31, No. 24, pp. 2132–2133.

Japanese article published on Sep. 20, 1991, Edited by Zaidan Hojin Nihon Kikai Gakkai, President: Fumio Sato.

*Primary Examiner*—Rodney B. Bovernick
*Assistant Examiner*—Ellen E. Kang
*Attorney, Agent, or Firm*—Cushman Darby & Cushman Intellectual Property Group of Pillsbury Madison & Sutro LLP

[57] ABSTRACT

In general, the semiconductor laser device of the present invention comprises an emitting element comprising a doped diamond, which is doped with atoms of at least one rare earth metal and/or molecules of at least one compound containing a rare earth metal. The semiconductor laser device assembly according to the present invention comprises an emitting element of a doped diamond, which is a diamond doped with atoms of at least one rare earth metal and/or molecules of at least one compound containing a rare earth metal, and a thermal releasing element of a substantially undoped diamond, on which the semiconductor laser device are placed.

14 Claims, 4 Drawing Sheets

SEMICONDUCTOR LASERS COMPRISING RARE EARTH METAL-DOPED DIAMOND

BACKGROUND OF THE INVENTION

1. Field of The Invention

The present invention is directed to semiconductor lasers containing rare earth metals, and more particularly, to semiconductor lasers having improved stability on emission wavelength at room temperature and improved mechanical performances.

2. Related Background Art

Advanced optical transmission systems are strongly required in recent optical communication industries, so as to allow higher data capacity to be transmitted through longer-distance lines. The important technologies for advanced optical transmission systems include optical multiple communication technologies in which a plural series of data can be simultaneously transmitted through a single optical fiber, and the higher-sensitive coherent optical communication technologies in which the optical signals for transmission are modulated via phase or frequency modulations.

Improved accuracy in absolute wavelength (or frequency) of the optical signal is also required for the particular optical transmission systems such as the coherent optical frequency division multiplexing (optical FDM) transmission systems. In the recent development activities in the coherent optical FDM transmission systems, a transmission method for transmitting with higher capacity has been proposed, in which 10 or more channels of optical signals are simultaneously transmitted with frequency intervals of 5 GHz. Stabilization of the transmission frequencies of the multi-channel signals can be achieved in the following manner in many experimental works of the optical FDM transmission systems; one optical source is selected as a reference optical source having a reference frequency; the reference frequency is stabilized; and then the frequencies of the other optical signals are stabilized by stabilizing the frequency intervals between the reference signal and each signal.

Semiconductor lasers have been proposed for use as optical sources in such optical transmission systems. In particular, semiconductor lasers of III–V compounds, such as GaAs and InP, have been extensively studied in focusing their operational capability. However, there are several problems in employing the semiconductor lasers of III–V compounds to such optical transmission systems: the semiconductor lasers have a tendency to disperse their spectra due to the momentum of electrons, since the semiconductor lasers emit the light via bandgap emission; and their wavelengths and the spectra are generally influenced by the operating temperature.

To overcome these problems, several studies have been made with semiconductor lasers which comprise an active region doped with rare earth metals such as erbium (Er) or ytterbium (Yb). Typical development study on such doped semiconductor lasers is, for example, reported by Tsang et.al. (Tsang, W. T., et. al. Appl. Phys. Lett. 49(25), 22 Dec. 1986, pp. 1686–1688: Reference 1), where Er ions are doped into the active layer in the InGaAsP/InP double-hetero structure. The disclosure of Tsang et.al. (Reference 1) is hereby incorporated by reference. Tsang et.al. discloses the rare earth/semiconductor laser operation scheme. When electrical current is applied to such doped semiconductor laser, the energy transition of Er ions ($Er^{3+}$) from the excited state to the ground state dominantly occurs in the active layer, resulting the laser emission due to $Er^{3+}$ transition.

Also, there are a number of development studies, for the purpose of obtaining laser emission by the energy transition of rare earth metals doped in the semiconductor materials. These studies are directed to using different semiconductor materials: rare earth metal-doped Si is used as a semiconductor (Rogers, J. L., et.al., Journal of Vacuum Science and Technology, A 12(5), September/October 1994, pp.2762–2766: Reference 2); rare earth metal-doped GaAs and the mixed crystals of GaAs films are grown by cyclotron resonance plasma enhanced CVD (Takahei, K., et.al., Journal of Applied Physics, 76(7), 1 Oct. 1994, pp.4332–4338: Reference 3; Japanese Patent Laid-Open SHO 64-74783: Reference 4; JP Laid-Open HEI 3-227092: Reference 5); photoluminescence from Er-doped GaN and AlN films is observed (Wilson, R. G., et.al., Applied Physics Letters, 65(8), 22 August 1994, pp.992–994: Reference 6); Photoluminescence from Er-doped SiC is observed (Choyke, W. J. et.al., ibid, 65(13), 26 Sep. 1994, pp.1668–1670: Reference 7). In addition, similar semiconductor lasers are disclosed in JP Laid-Open HEI 5-291655: Reference 8; JP Laid-Open HEI 6-216446: Reference 9; JP Laid-Open HEI 6-216455: Reference 10; and JP Laid-Open HEI 6-219776: Reference 11. The disclosures of the references 2 to 11 are also hereby incorporated by reference.

The semiconductor laser of Tsang et.al.(Reference 1), however, merely exhibits a pulse emission from the Er-doped GaInAsP active layer, and no further investigation is shown for obtaining continuous emission by increasing emission efficiency and gain. The References 2, 3, 6 and 7 also show only the observation of the emitted light from the rare earth doped semiconductor materials, and no further proposal for utilizing their rare earth metal-doped semiconductor materials into the laser is shown.

References 4, 5, 8–11 show the semiconductor lasers which utilize energy transition of rare earth metals. However, References 4, 5, 8–11 do not provide any improvement of the semiconductor laser itself for stabilizing its emission frequency when a certain mechanical shock is applied to the semiconductor laser, the application of the mechanical shock being often experienced in using semiconductor lasers as optical sources of the optical transmission systems.

Consequently, it is desirable to provide a semiconductor laser, which is capable of continuously emitting with improved energy efficiency at room temperature, without fluctuating emission frequency.

It is also desirable to provide a semiconductor laser, which is dimensionally small and has higher reliability, when used as a optical source of the optical transmission system.

SUMMARY OF THE INVENTION

The present invention satisfies these needs.

In general, the semiconductor laser device of the present invention comprises an emitting element comprising a doped diamond, which is doped with atoms of at least one rare earth metal and/or molecules of at least one compound containing a rare earth metal. The rare earth metal may be erbium (Er). Alternatively, the rare earth metal may be selected from the group consisting of neodymium (Nd), samarium (Sm), europium (Eu) and ytterbium (Yb).

The semiconductor laser device of the present invention can emit light when the emitting element is irradiated with pumping light. The pumping photons are absorbed in the rare earth metal-doped diamond to enhance the density of excited electrons. Such electrons with increased density will cause enhanced stimulated-emission in $Er^{3+}$ to increase the gain of the semiconductor laser.

The semiconductor laser device of the present invention can also emit light when carriers are injected into the emitting element through electrodes formed in the semiconductor laser device.

The semiconductor laser device of the present invention has improved stability in emission frequency against mechanical shock or impact, because the emitting element of the semiconductor laser device comprises diamond, which is an extremely hard and rigid material, so that substantially no mechanical distortion of the emitting element is caused by the ordinary mechanical shock or impact applied during the operation of the semiconductor laser device.

The semiconductor laser device of the present invention also has improved photoelectric properties: either the carriers injected into the emitting element or the excitation photons of the pumping light irradiating the emitting element, are consumed less by diamond, because the bandgap of diamond is considerably wide (=5.5 eV), and the optical transitions of diamond caused by the doped carriers or the injected photons occur with much smaller transition probability than that of other semiconductor materials such as GaInAsP, GaAs or SiC. Further, the consumption of the carriers due to the internal band transition in the emitting element is also reduced since the diamond is the indirect optical transition material.

In addition, the interaction of the rare earth metal atoms with carbon atoms of the diamond crystal lattice is almost negligible, because the crystal lattice structure of the diamond is dimensionally small.

The semiconductor laser device according to the present invention is also suitable for long-term continuous operation. Since diamond has high thermal conductivity, high density carriers can be injected into the emitting element while the considerable amount of heat produced in the emitting element by high density carriers is effectively transferred outside, thereby avoiding the overheating of the semiconductor laser device.

In one aspect of the present invention, the rare earth metal is erbium (Er), and the concentration of the doped Er atoms in the diamond may be about 1–50,000 ppm. The Er-doped diamond of the emitting element of the semiconductor laser device according to the present invention may further include nitrogen (N) atoms with a concentration of not less than 1 ppm. The concentration of the nitrogen atoms in the diamond may be in the range of about 100 ppm to 50,000 ppm. The nitrogen atoms doped in the erbium-doped diamond assist assist enhance the ionization of the erbium atoms.

The Er-doped diamond of the emitting element of the semiconductor laser device according to the present invention may further include oxygen or oxygen-containing compound, instead of nitrogen atoms, for the purpose of enhancing the ionization of the erbium atoms. Nevertheless, nitrogen atoms are easier to be doped into the diamond than oxygen, so that the nitrogen-doping is more suitable to achieve emission with higher power than oxygen-doping.

In another aspect of the present invention, the Er-doped diamond of the emitting element of the semiconductor laser device according to the present invention further includes boron (B) atoms with a concentration of not less than 1 ppm. The concentration of the boron atoms in the diamond may be in the range of about 100 ppm to 50,000 ppm. The boron atoms doped in the erbium-doped diamond also assist to enhance the ionization of erbium atoms.

In yet another aspect of the invention, the Er-doped diamond of the emitting element of the semiconductor laser device further include both nitrogen (N) atoms with a concentration of not less than 1 ppm and boron (B) atoms with a concentration of not less than 1 ppm. The relaxation of the intermolecular stress occurs between the nitrogen atom having larger atomic radius and the boron atom having smaller atomic radius. Therefore, the doping with increased dopant concentration can be achieved without affecting crystallinity of the diamond. Further, the nitrogen atoms and boron atoms in the erbium-doped diamond also contribute to enhance the ionization of erbium atoms.

In general, the semiconductor laser device assembly according to the present invention comprises an emitting element of a doped diamond, which is a diamond doped with atoms of at least one rare earth metal and/or molecules of at least one compound containing a rare earth metal, and a thermal releasing element of an undoped diamond, on which the semiconductor laser device is placed.

The thermal releasing element is made of undoped diamond whose thermal conductivity is sufficiently high to effectively absorb the heat from the emitting element. Therefore, the overheating of the semiconductor laser device is avoided so that the laser device assembly is capable of maintaining stable emission for long-term continuous operation. Further, the thermal releasing element can be formed in the same processing apparatus for the emitting element, facilitating the production of the semiconductor laser device assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

These and other features, aspects, and advantages of the present invention will become better understood with reference to the following description, appended claims, and accompanying drawings, where:

DESCRIPTION OF THE PREFERRED EMBODIMENTS

Figure 1A:
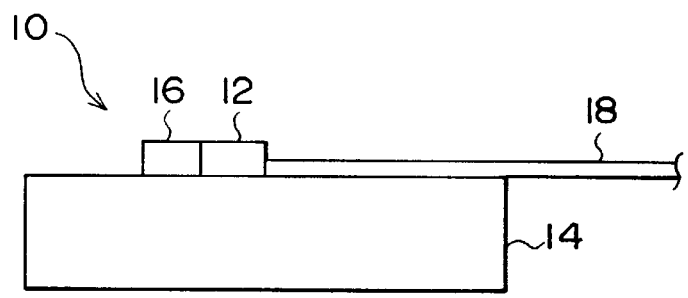
FIG. 1A is a side schematic view of a preferred embodiment of a semiconductor laser device assembly according to the present invention, in which pumping light is irradiated by the attached pumping laser.

In the figures, identical reference numerals indicate the same element.

Here, the action of the semiconductor laser device according to the present invention will be fully described.

The rare earth metal atoms are excited to achieve transition from the ground state to the excited state, when sufficient energy is injected into the rare earth metal-doped diamond via either electrical current or photons. The excited rare earth metal atoms emit light with a characteristic wavelength according to the intra-shell transitions of spin split orbitals of the rare earth metal. For example, $Er^{3+}$ ($4f^{11}$) can emit light with the wavelength of 1.536 $\mu$m, due to the $^4I_{13/2}$–$^4I_{15/2}$ transition of $Er^{3+}$. The emission having wavelength of 1.536 $\mu$m is useful for the typical optical communication systems, because the wavelength 1.536 $\mu$m is close to the minimum loss wavelength range of the silica fibers, which are typically used in the optical communication systems. Neodymium (Nd) also emits light with wavelengths of around 1.06 $\mu$m and 1.3 $\mu$m, which are also useful for the typical optical, communication systems.

Further, the emission intensity of the transition of $Er^{3+}$ can increase by doping both erbium (Er) atoms and ytterbium (Yb) atoms into the diamond. In addition, the emission wavelength can be changed to a desired value by adjusting the doping ratio of Yb to Er.

The optical transition action of the doped rare earth metals, discussed above, is also described in Tsang et.al. (Reference 1), where it is reported that the emission of an Er-doped InGaAsP laser with the wavelength of 1.536 $\mu$m was observed.

Further, the semiconductor laser device of the present invention exhibits very small fluctuations in emission wavelength when considerable change of the operating temperature occurs. Only a negligible fluctuation in emission wavelength occurs due to a slight change of the refraction index of the doped diamond by a change of the operation temperature.

Two excitation modes are available for exciting the emitting region to produce emission of the semiconductor laser device of the present invention; one mode is excitation by pumping light, and the other is excitation by carriers.

The excitation via the first mode can be effected by irradiating the pumping light from an annexed pumping laser to inject photons into the emitting region so that the emitting region is excited by the photons to emit light. In the first excitation mode, emission intensity can increase to increment the gain by having the laser resonator structure formed in the emitting region that can trap injected photons within itself to enhance the optical output density.

The excitation via the second excitation mode can be effected by injecting carriers into the emitting region. Any suitable structure can be formed for directly applying electric current into the emitting region in the present invention. For example, a pn-junction structure, Schottky junction structure or metal insulator structure (MIS) can be formed in the emitting region for the purpose of direct application of electrical current. In this manner, carriers injected into the doped diamond can excite Er to effect emission.

EXAMPLES

Example 1

Figure 1B:
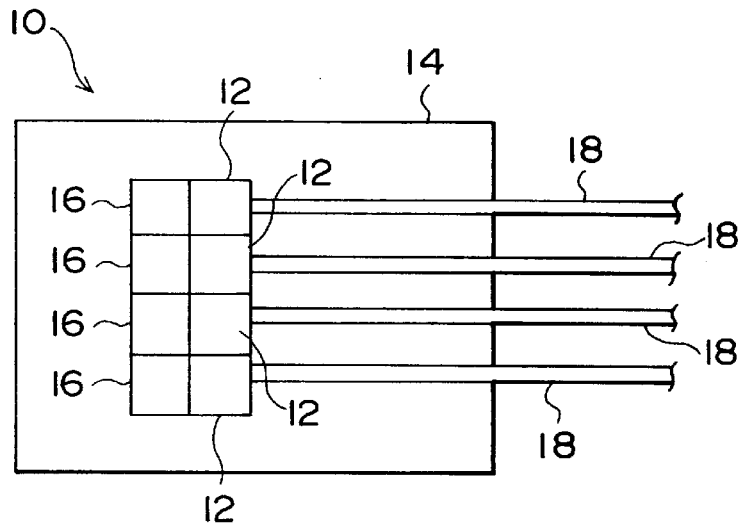
FIG. 1B is a plan schematic view of the semiconductor assembly shown in FIG. 1A.
Figure 1C:
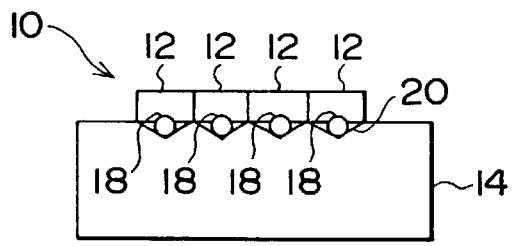
FIG. 1C is a front schematic view of the semiconductor assembly shown in FIGS. 1A and 1B.

The first embodiment according to the present invention illustrates a semiconductor diamond laser device, which emits light by pumping light irradiated into an emitting element from the annexed laser. In FIGS. 1A, 1B and 1C, a semiconductor laser device assembly 10 of the present invention comprises a laser emitting element 12, heat sink 14 consisting of undoped diamond, semiconductor pumping lasers 16 for injecting pumping light into the emitting element 12, and optical fibers 18 for transmitting light from the emitting element 12. The emitting element 12 of the first example consists of an emitting region of a Er-doped diamond, which is a diamond doped with erbium (Er) atoms, and magnesium fluoride/zeolite-type half mirrors (not shown), which are formed on edge surfaces of the emitting region. Therefore, the semiconductor laser device of the first example consists of the emitting element 12 and the half mirrors.

The procedure for manufacturing the laser emitting assembly will be described.

(1) Formation of the emitting region (Er-doped diamond).

First, undoped diamond film was formed via microwave plasma CVD. Er atoms were then implanted into the CVD synthesized diamond film via ion implantation to form the Er-doped diamond film. The half mirrors were formed onto the edge surfaces of the Er-doped diamond to complete the emitting region. The details of the manufacturing steps for the emitting region will be described.

The synthesis of the above-mentioned undoped diamond film was carried out in a known microwave plasma CVD apparatus. The synthesis conditions for the undoped diamond film were as follows:
microwave frequency: 2.45 (Ghz);
flow rate of hydrogen gas($H_2$): 200 (sccm);
flow rate of methane gas ($CH_4$): 6 (sccm);
chamber pressure: 100 (Torr);
microwave power: 300 (W);
substrate temperature: 1,100 (°C.);
duration: 25 (hrs); and
thickness of the formed film: 100 ($\mu$m).

The microwave plasma CVD is advantageous for the synthesis of the diamond film for the use in the present invention, because it is easier to locally concentrate power to locally enhance plasma concentration within the microwave plasma CVD apparatus. The diamond film for the use in the present invention may be formed by other known chemical or physical methods generally used for the diamond synthesis, such as thermal filament CVD, ion beam deposition or sputtering using a graphite as a sputtering target.

Er atoms were then implanted into the undoped diamond via a known ion implantation. The process condition for ion implantation is as follows:
acceleration energy: 180 (keV);
dose amount: $1\times10^{14}$ ($cm^{-2}$);
maximum implantation depth: 1.5 ($\mu$m); and
maximum doping concentration: $1\times10^{19}$ ($cm^{-3}$).

The manufacturing of the emitting region of the Er doped diamond was here completed. The edge surfaces of the emitting region were then covered with magnesium fluoride/zeolite-type coatings to form half mirrors on the edge surfaces of the emitting region. Here, the emitting element 12 consisting of the emitting element and the half mirrors was completed.

The Er doping concentration can also be calculated by the approximation described below. The doping distribution $N(x)$ of the implanted ions by ion implantation with (i) the acceleration energy of E (keV) and (ii) the dose amount or the total number of ions per unit area $N_d$ ($cm^{-2}$) can be approximately described using the Gaussian distribution:

$$N(x) = \frac{Nd}{(2\pi)^{1/2}\Delta Rp} \times \exp\left(\frac{-(x-Rp)^2}{2\Delta Rp^2}\right) \times 10^8 \quad (1)$$

where Rp (angstrom) is the projected range, and ΔRp (angstrom) is the standard deviation of Rp or the projected straggle.

The projected range Rp and the projected straggle ΔRp can be obtained by applying LSS theory:

$$Rp = \frac{1.1 \times 10^{26} \times (M_1 + M_2)}{N_m \times (3M_1 + M_2)} \times \frac{(Z_1^{2/3} + Z_2^{2/3})^{1/2}}{Z_1 Z_2} \times E \quad (2)$$

$$\Delta Rp = \frac{1}{4} \times \frac{1.1 \times 10^{26}}{N_m} \times \left(\frac{M_2}{M_1}\right)^{1/2} \times \frac{(Z_1^{2/3} + Z_2^{2/3})^{1/2}}{Z_1 Z_2} \times E \quad (3)$$

where $M_1$ is the atomic weight of the doped ion (erbium ion), $M_2$ is the atomic weight of the material to be doped (diamond), $Z_1$ is the atomic number of the doped ion, $Z_2$ is the atomic number of the material to be doped, and $N_m$ is the total number of atoms per unit volume in the material to be doped. The calculated values of Rp and ΔRp can be substituted into the eq. (1) to provide the calculated ion concentration N(x) at the depth x.

For example, when ion implantation is carried out under the conditions of: the acceleration energy E=300 (keV) and the dose amount Nd=$2\times10^{14}$ (cm$^{-2}$), the projected range Rp and the projected straggle ΔRp are calculated by the equations (2) and (3) to give: Rp=1,000 (angstroms) and ΔRp= 300 (angstroms). Then the calculated values of Rp and ΔRp are applied to the equation (1) of the Gaussian distribution, thereby the calculated value of N(x) at x=1,000 (angstroms) is $1\times10^{19}$ (cm$^{-3}$). The resultant doping concentration of Er in the Er-doped diamond can also be experimentally evaluated by using the secondary ion-mass spectrography (SIMS).

(2) Formation of the heat releasing element (the heat sink).

Figure 3:
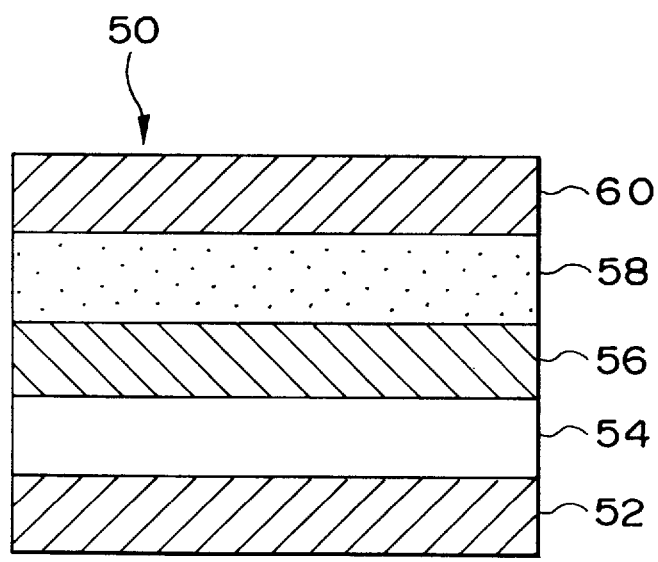
FIG. 3 is a cross-sectional schematic view of a semiconductor laser device of the third embodiment according to the present invention, in which electrodes are formed.

As shown in FIGS. 1A, 1B and 1C, the laser device assembly 10 of the first example comprises a heat releasing element or heat sink 14 consisting of an undoped diamond. The surface of heat sink 14 has wedge-shaped patterns 20 for suitable alignment of the optical fiber, as schematically shown in FIG. 3.

The heat sink 14 was formed in accordance with the following manufacturing steps. An undoped diamond film for the heat sink 14 was formed via microwave plasma CVD, using the same microwave plasma CVD apparatus as used in the manufacturing of the undoped diamond film for the emitting element. The synthesis conditions for the undoped diamond film were as follows:
microwave frequency: 2.45 (GHz);
flow rate of hydrogen gas (H$_2$): 200 (sccm);
flow rate of methane gas (CH$_4$): 4 (sccm);
chamber pressure: 100 (Torr);
microwave power: 500 (W);
substrate temperature: 1,100 (°C.);
duration: 75 (hrs);
thickness of the formed film: 300 ($\mu$m); and
thermal conductivity of the resultant diamond film: 1,500 (W/mK).

The diamond film for the heat sink may be formed by other known chemical or physical methods generally used for the diamond synthesis. It is preferable to carry out forming the diamond for the heat sink using the same apparatus as used in forming the diamond for the emitting element, in view of facilitating the entire production process. However, a separate apparatus may be used for the processing of the heat sink, if there is any further requirement in film qualities or in processing cycle, to carry out forming of the heat sink with a different apparatus from the apparatus for the emitting element. The different forming method may also be used as required.

The thermal conductivity of the formed diamond was evaluated by the steady comparison method, which is a modification of the steady absolute method. We will outline the steady absolute method first, and then describe the steady comparison method.

In the steady absolute method, a steady state in the temperature distribution of the sample (undoped diamond) is attained. In the thermal steady state, the status of the heat transfer within the sample can be described by the Fourier's equation of the following:

$$q = -\lambda \text{grad } T (W/m^2) \quad (4)$$

where q is a heat flux, $\lambda$ is a thermal conductivity, and grad T is a gradient of temperature toward the advancing direction of the heat flux. When the heat flux within the sample is produced and maintained by input of the external heat from the external heat source, such as electrical heater, the external heat input must be equivalent to the heat flux (q) within the sample for the steady state. Thermal conductivity of the sample can be, therefore, determined by the calculation of the equation (4) with the external heat input (q) and measured grad T of in the sample.

However, in reality, the external heat input is not necessarily equal to the heat flux (q), which adversely affects accurate measurement of the thermal conductivity. Therefore, the steady comparison method is widely used, in which the thermal conductivity of the sample is evaluated by further comparison with a heat transfer within another material having a known, but different, thermal conductivity. The present invention also employs the steady comparison method for evaluating the thermal conductivity of the heat sink.

In the steady comparison method for the present invention, the heat q is given by the external heat source to another material having known thermal conductivity $\lambda_s$, and the temperature gradient (grad T)$_s$ formed within another material by the external heat q is measured. Then the equivalent heat q is also given to the undoped diamond, and the corresponding temperature gradient (grad T) formed within the undoped diamond are also measured. The thermal conductivity $\lambda$ of the undoped diamond can be calculated by using the following equation (5):

$$\lambda = \lambda_s \times (\text{grad } T)_s / (\text{grad } T) \ (W/mk) \quad (5)$$

The details of the steady comparison method is described in, for example, "Netsubussei Sokuteiho (methods for measuring the thermal properties)", Nihon Kikaigakkai-Hen (edited by Japan Society of Mechanical Engineers), published by Yokendo, Tokyo Japan, 1991, pp.1 to 5, the disclosure of which is hereby incorporated by reference.

Thermal conductivity of the undoped diamond for a heat sink according to the present invention was evaluated by using a commercially available steady comparison method apparatus for measuring thermal conductivity (produced by Rigaku Denki Sha, Japan), and by using gold (Au) as "another material having known thermal conductivity".

The wedge-shaped grooves 20 for aligning the optical fibers 18 were formed on the surface of the heat sink 14, as shown in FIG. 1C. The steps for forming grooves 20 will be described. Aluminum (Al) was deposited over the entire surface of the heat sink 14 by sputtering. After the appropriate patterning on the Al layer by conventional photolithography, etch processing was carried out by the reactive ion etching (RIE) using $O_2$, to form grooves for aligning optical fibers 18 and the emitting element 12 on the surface of heat sink 14. The processing conditions for the reactive ion etch were as follows:

$O_2$/Ar ratio in volumetric
- flow rate: 1 (%);
- RF frequency: 13.56 (Mhz);
- RF power: 500 (W);
- pressure: 0.1 (Torr);
- duration: 3 (hrs); and
- etch depth: 10 ($\mu$m).

Thus, the heat sink 14 was formed to have alignment grooves 20, which were provided for the purpose of suitably mounting the laser emitting element 12 and optical fiber 18 on the surface of the heat sink 14. The alignment grooves 20 are also suitable for aligning pumping lasers 16 on the surface of the heat sink 14. The alignment grooves 20 are designed to have appropriate dimensions and geometries, which are conformal to the lower surfaces of the emitting elements 12, pumping lasers 16 and the optical fibers 18. The suitable patterning for the alignment must be made during the step of photolithography.

(3) assembling the elements into the semiconductor laser device assembly.

The semiconductor laser device assembly 10 was formed by assembling the laser emitting elements 12, the heat sink 14, the pumping lasers 16, which are commercially available InGaAsP semiconductor lasers, and the optical fibers 18, which are well-known quartz optical fibers.

Each of the pumping lasers 16 was optically connected to the corresponding laser emitting element 12 which was already optically connected to the optical fiber 18, so that pumping light from each of the pumping lasers 16 was effectively injected into the corresponding laser element 12. The optical connections among these parts was made under the following conditions. First, the optical fiber 18 for transmitting light from the emitting element 12 was optically connected to one of the surfaces of the emitting element, as schematically shown in FIG. 1C. Then, both the emitting elements 12 connected to the optical fibers 18 and the pumping lasers 16 were mounted onto the grooved surface of the heat sink 14, suitably aligning into the alignment grooves 20. Gold-tin was used for the mounting. Both the laser emitting elements 12, with the respective optical fibers 18, and the pumping lasers 16 were suitably placed into the conformal grooves 20, which had been precisely formed via RIE processing, the end surfaces of the emitting elements 12 being optically connected to the corresponding end surfaces of the pumping lasers 16. Finally, hermetic sealing was used to seal the whole assembled structure, and the sealed structure was filled with an inert gas, i.e., Ar gas. The semiconductor laser device assembly of the first example was completed.

It is preferable to use semiconductor pumping lasers for the pumping lasers in the present invention, because it is advantageous to miniaturize the semiconductor laser device assembly of the present invention by using small semiconductor pumping lasers. The preferable examples of the semiconductor pumping laser for the use in the present invention may be a semiconductor laser including InGaAs/AlGaAs distorted superlattice structure, which emits light having a wavelength of about 0.98 $\mu$m, or may be an AlGaInP type semiconductor laser, which emits light having a wavelength of about 0.67 $\mu$m.

Figure 2:
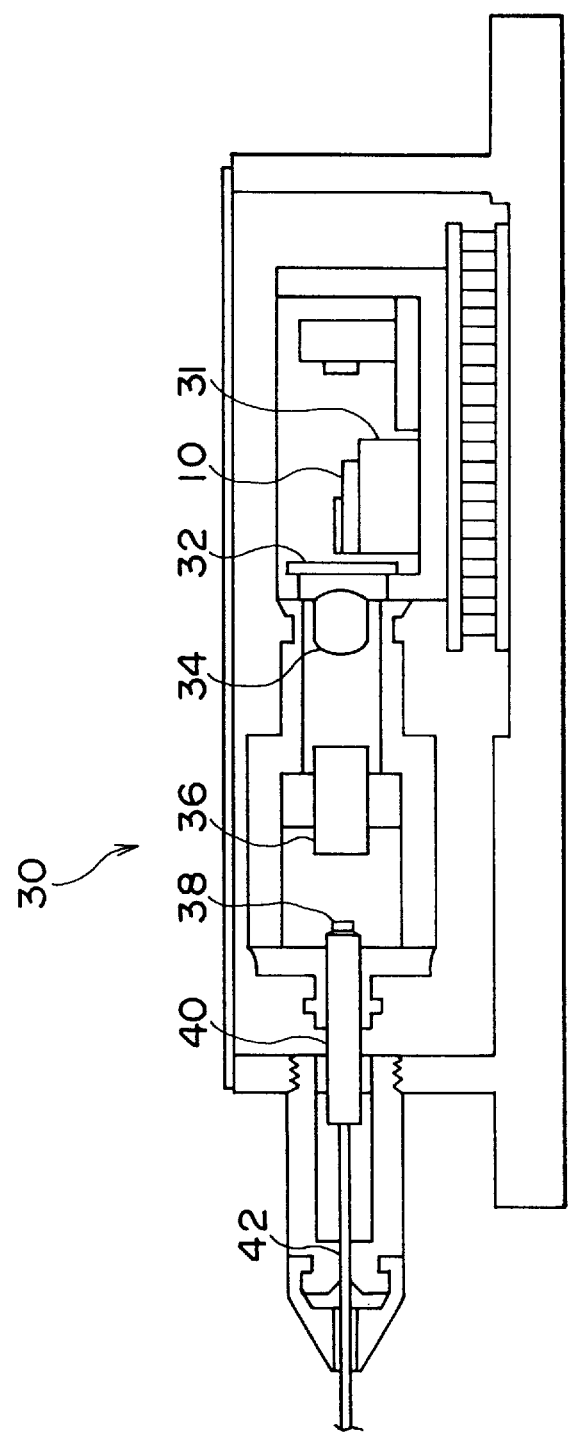
FIG. 2 is a cross-sectional schematic view of a module, in which the semiconductor laser device according to the present invention can be mounted.

FIG. 2 is a schematic cross-sectional view of a module 30, within which the semiconductor laser device assembly according to the present invention is mounted. The semiconductor laser device assembly 10 is mounted onto a holder 31 in the module 30. The light emitted from the semiconductor laser device assembly 10 passes through a sapphire window 32, impinges into a non-spherical lens 34, enters through an isolator 36 into a capillary 38 and advances through an optical fiber 42 which is supported by a ferrule 40.

The operating performances of the semiconductor laser device assembly 10 was evaluated, when the laser device assembly 10 was mounted within the module 30. As shown in FIGS. 1A and 2, electrical current was applied to the pumping lasers 16 so as to emit pumping light for injecting photons into the laser emitting elements 12. The optical transition of Er within the irradiated Er-doped diamond occurred to emit light. It was confirmed that the semiconductor laser device assembly 10 exhibited the single vertical mode operation with the sub-mode suppression ratio of not less than 40 dB.

It was also demonstrated that the semiconductor laser device assembly 10 could emit light with much increased intensity, because the heat sink 14 and the emitting elements 12 were substantially formed of diamond, which has excellent thermal conductivity, so that increased electrical power could be applied to the pumping lasers 16 without overheating the emitting elements 12.

Example 2

In the second example according to the present invention, nitrogen atoms (N) were further doped into the equivalent Er-doped diamond material (the emitting element) of the first example, with a doping concentration of 1,000 ppm. The semiconductor laser device assembly of the second example also consists of emitting elements 12, a heat sink 14, pumping lasers 16 and optical fibers 18, as shown in FIGS. 1A, 1B and 1C. The emission intensity of the laser device assembly of the second example was increased about one-order of magnitude over the semiconductor laser device assembly of the first example, when electrical power was applied to the pumping laser of the second example with the equivalent power level as used in the first example.

The semiconductor laser device assembly of the second example was manufactured by the same manufacturing steps used in the first example, except that nitrogen atoms were also doped at a doping concentration of 1,000 ppm, during the ion implantation step for doping erbium atoms. The semiconductor laser device assembly obtained was mounted within the module 30, as described in the first example. It was observed that the laser device assembly could emit light with the emission intensity of 5 mW, when electrical power was applied to the pumping lasers with the equivalent power level as used in the first example. Therefore, it was demonstrated that the nitrogen atoms doped into the Er-doped diamond contribute to increase the emission intensity of the Er-doped diamond luminescence.

It was further evaluated that the nitrogen doping at the concentration in the range from about 100 ppm to about 50,000 ppm is preferable for enhancing emission intensity of Er-doped diamond.

One modification of the second example was carried out, in which boron (B) atoms were used, in lieu of nitrogen atoms. It was also confirmed that the boron atoms doped into the Er-doped diamond contribute to enhance the emission intensity of the Er-doped diamond luminescence. It was further evaluated that the boron doping at the concentration in the range from about 100 ppm to about 50,000 ppm is preferable for enhancing emission intensity of Er-doped diamond.

Another modification of the second example was also made in which boron (B) atoms were simultaneously doped with the doping concentration of 1,000 ppm, when nitrogen atoms were doped with the doping concentration of 1,000 ppm in the ion implantation process. It was observed that the laser device assembly could emit light with the intensity of 6.5 mW, when electrical power was applied to the pumping lasers with the equivalent power level as used in the first example. Therefore, it was demonstrated that, both nitrogen atoms and the boron atoms, doped into the Er-doped diamond, could contribute to further enhance the emission intensity of the Er-doped diamond luminescence in about 30%, in conjunction with the nitrogen doping.

It was further evaluated on the combination of the nitrogen concentration and the boron concentration, that, the nitrogen concentration in the range from about 100 ppm to about 100,000 ppm and the boron concentration in the range from about 100 ppm to about 100,000 ppm, is preferable for the purpose of enhancing emission intensity of Er-doped diamond.

Example 3

In the third example according to the present invention, a boron-doped (B-doped) diamond layer was formed onto the bottom surface of the equivalent Er-doped diamond as used in the first example, and a substantially undoped diamond layer was also formed onto the top surface of the Er-doped diamond. An electrode was formed on each of the upper and lower additional layers for injecting electrical current into the Er-doped diamond of the semiconductor laser device. The Er-doped diamond is an emitting element, as described in the first example.

As shown in FIG. 3, a semiconductor laser device 50 of the semiconductor laser of the third example comprises Er-doped diamond 56, which is equivalent to the Er-doped diamond used in the first and the second examples, an upper layer of a B-doped diamond 54, and a lower layer of undoped diamond 58. Electrodes 52 and 60 were formed on the upper and the lower layers 54 and 58, respectively.

An undoped diamond layer for the upper B-doped layer was formed on the upper surface of the Er-doped diamond 56, by the equivalent microwave plasma CVD process as used in the first and second example, and then boron atoms were implanted into the undoped layer formed to form B-doped diamond layer 54 by the equivalent ion implantation processing as used in the first and second example. The lower undoped diamond layer 58 was also formed onto the lower surface of the Er-doped diamond 56, by the equivalent microwave plasma CVD processing as used in the first and the second example.

Figure 4A:
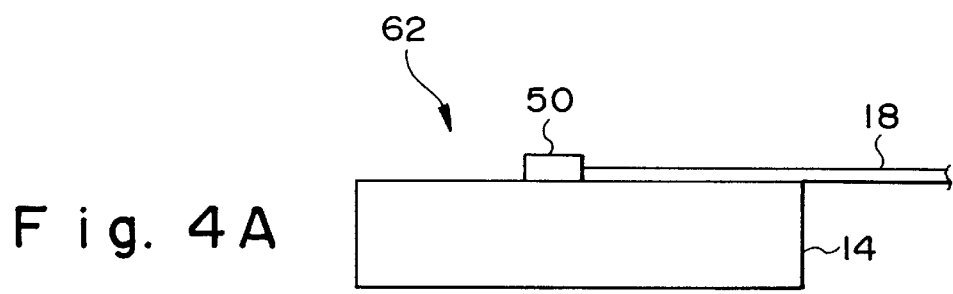
FIG. 4A is a side schematic view of the semiconductor laser device assembly of the third embodiment, in which carriers are injected.
Figure 4B:
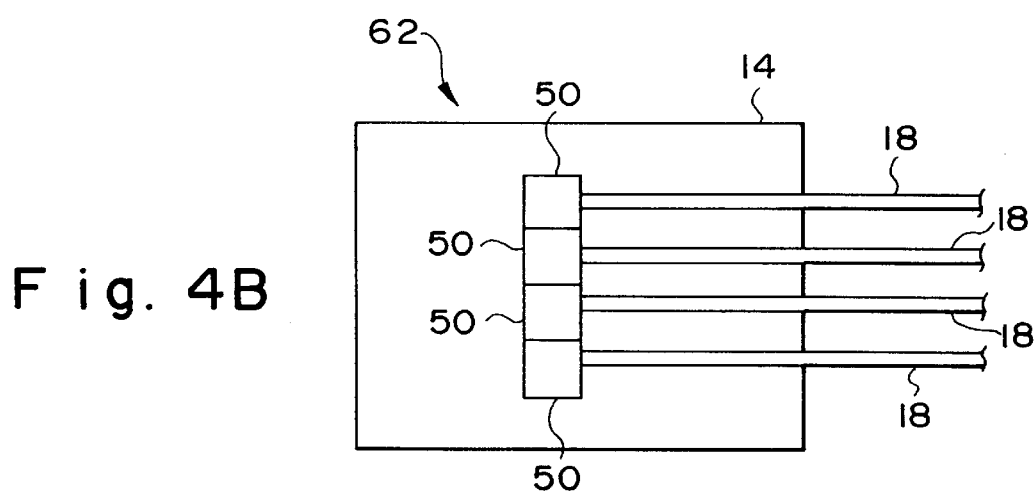
FIG. 4B is a plan schematic view of the semiconductor assembly shown in FIG. 4A.
Figure 4C:
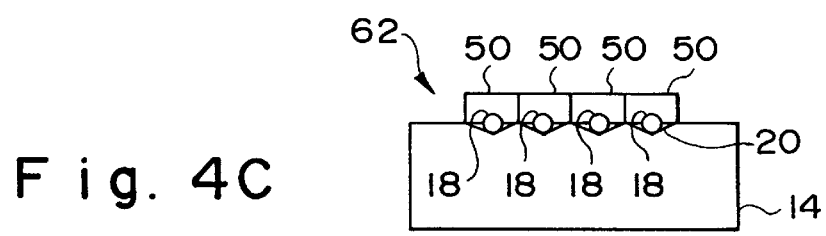
FIG. 4C is a front schematic view of the semiconductor assembly shown in FIGS. 4A and 4B.

FIGS. 4A, 4B and 4C schematically show the semiconductor laser device assembly 62 of the third example. FIGS. 4A, 4B and 4C indicate that the semiconductor laser device assembly 62 includes no pumping lasers, and laser emitting elements 50 and optical fibers 18 are positioned to be suitably aligned within the grooves 20 on the surface of the heat sink 14. The semiconductor assembly of the third example includes a means for applying electrical current to the emitting elements 12 through electrodes 52 and 60 (not shown).

The semiconductor laser device assembly obtained was mounted within the module 30, as described in the first example. It was observed that the laser device assembly could emit light with the intensity of 1 mW, when electrical power was applied to the emitting region 56 through electrodes 52 and 60.

Example 4

The semiconductor laser device assembly of the fourth example includes pn-junctions in the emitting elements, for the purpose of enhancing the injection of carriers into the emitting element. The semiconductor laser device has the same layer structure as shown in FIG. 3, except that (i) Er-doped diamond 56 is further doped with boron atoms, with a doping concentration of 10 ppm, and (ii) undoped layer 58 is substituted by an n-type semiconductor diamond layer, which is a doped diamond with phosphorus (P). Thus, the Er-doped diamond has a pn-junction at its interface with the P-doped diamond, which is formed onto the Er-doped diamond. The semiconductor laser device also comprises two electrodes, one of which is formed over the P-doped layer, and the other is formed under the B-doped layer, as shown in FIG. 3.

The semiconductor laser device assembly obtained was mounted within the module 30, as described in the third example. It was observed that the laser device assembly could emit light with the intensity of 10 mW, when electrical power was applied to the emitting region (Er-doped diamond) through electrodes and through the pn-junction formed between the Er-doped diamond and P-doped diamond layer. Therefore, it was confirmed that the emission intensity of the Er-doped diamond luminescence was increased about one-order of magnitude over the semiconductor laser device assembly of the third example, when carriers can be effectively injected through pn-junction.

Example 5

The fifth example of the present invention illustrates a semiconductor laser device assembly having an emitting element, which is an Er-doped diamond doped with an Er-containing compound: tris (2,2,6,6)-tetramethyl-3,5-heptanedionato erbium, abbreviated as Er(thd)$_3$. In this example, the semiconductor laser device assembly has similar constitution as shown in the first example. The emitting element was manufactured by the similar manufacturing steps as described in the first example, except that the Er(thd)$_3$ was simultaneously implanted into the "growing diamond" with a doping concentration of 1,000 ppm, during the microwave plasma CVD processing for depositing diamond as used in the first example, and no further ion implantation process was used. The semiconductor laser device assembly obtained was mounted within the module 30, as described in the first example.

The semiconductor laser device assembly obtained was mounted within the module 30, as described in the first example. It was observed that the laser device assembly could emit light with the intensity of 10 mW, when electrical power was applied to the pumping lasers with the equivalent power level as used in the first example. Therefore, it was found that the uniform doping was achieved when doping of Er(thd)$_3$ was carried out simultaneously with the deposition process for diamond, thereby increasing the emission intensity of the Er-doped diamond luminescence.

Experiment for the Comparison Purposes:1

The following "Experiments for the Comparison Purposes": 1–3; illustrate semiconductor laser device assemblies, which are not the embodiments according to the present invention, and are not included within the scope of the present invention. The experiments for the comparison purposes will be described only for the comparison from the present invention.

The semiconductor laser device assembly of the first comparison experiment has similar constitution as that shown in the fifth example of the present invention, except that the Er-doping diamond was formed with the doping concentration of more than 50,000 ppm.

However, the resultant diamond had much worse crystallinity, with sedimenting graphite-carbons over the surface of the formed diamond. The luminescence of the diamond obtained with doping concentration of more than 50,000 ppm was impossible.

Experiment for the Comparison Purposes:2

The semiconductor laser device assembly of the second comparison experiment has also similar constitution as that shown in the fifth example of the present invention, except that the Er-doping diamond was formed with the doping concentration of less than 1 ppm.

However, laser emission from the diamond obtained was impossible, although the diamond obtained had equivalent crystallinity as undoped diamond, in accordance with the measurements based on the width of half value of X-ray diffraction patterns.

Experiment for the Comparison Purposes:3

The semiconductor laser device assembly of the third comparison experiment also has similar constitution as shown in the fifth example of the present invention, except that the heat sink of undoped diamond was formed to have the thermal conductivity of 900 (W/mK), via the microwave plasma CVD processing under the following depositing conditions:

microwave frequency: 2.45 (GHz);
flow rate of hydrogen gas($H_2$): 200 (sccm);
flow rate of methane gas ($CH_4$): 8 (sccm);
chamber pressure: 100 (Torr);
microwave power: 500 (W);
substrate temperature: 1,100 (°C.);
duration: 75 (hrs);
thickness of the formed film: 300 ($\mu$m); and
thermal conductivity of the resultant diamond film: 900 (W/mK).

The major different point of the above conditions from the corresponding conditions used in the Example 5 was that the flow rate of methane gas ($CH_4$) changes to 8 sccm from the 4 sccm. The evaluation of the thermal conductivity was carried out by the steady comparison method, which has also been described in the first example of the present invention.

The semiconductor laser device assembly obtained was also mounted within the module 30 in order to evaluate the luminescence of the semiconductor laser device assembly, as described in the fifth example of the present invention. The stable emission with the desired intensity was, however not achieved, when power applied to the pumping lasers was increased to the desired level. Because less thermal conductivity of the heat sink could only provide insufficient heat transfer from the emitting element to outside, thereby the temperature of the entire semiconductor laser device assembly undesirably increased to fluctuate the emission in terms of emission intensity.

The diamond having different thermal conductivity can be formed in the microwave plasma CVD process, by changing the conditions of the supplying carbon atom source gas, such as species, concentration and flow rate of the carbon atom source gas. In general, higher concentration of the carbon source gas provides less thermal conductivity, while providing higher deposition rate.

Here we will describe another semiconductor laser of another experiment. Another semiconductor laser device assembly was manufactured, which had another heat sink of undoped diamond having thermal conductivity of 1,000 (W/mK). The thermal conductivity was adjusted by slightly decreasing the flow rate of methane gas in the microwave CVD process. The resultant semiconductor laser device assembly was also mounted within the module 30, in order to evaluate the luminescence of the semiconductor laser device assembly, as described in the fifth example of the present invention. The stable emission with the desired intensity was achieved with the constant emission wavelength, when power applied to the pumping lasers was increased to the desired level. The overheating of the entire assembly was avoided, by employing the heat sink having sufficient thermal conductivity.

Therefore, at least 1,000 (W/mK) of thermal conductivity is required for the heat sink of the semiconductor laser device assembly according to the present invention in order to effectively transfer heat from the semiconductor laser device during operation.

The detailed description of the preferred embodiments according to the present invention, and the other experiments for the comparison purposes, demonstrate that the present invention provide a semiconductor laser device assembly which is capable of emitting light having constant wavelength with high and stable emission intensity during the long term continuous operation. This advantage comes from one of the aspects of the present invention: the semiconductor laser device assembly of the present invention employs rare earth-doped diamond for the emitting element.

In addition, the semiconductor laser device assembly according to the present invention has excellent stability in emission intensity and emission frequency, because diamond having higher thermal conductivity is employed for a heat sink so that overheating is avoided by smooth heat transfer.

Consequently, the present invention provides semiconductor laser device assembly which is capable of continuously emitting light at room temperature with stable emission frequency.

In other expressions, the present invention provides the adequately small and reliable semiconductor laser device assembly for readily being applied to industrial applications.

Although the present invention has been described in considerable detail with reference to certain preferred embodiments, many other embodiments should be apparent to those skilled in the art. Therefore, the spirit and the scope of the appended claims should not be limited to the description of the preferred embodiments contained herein.

The basic Japanese Application No. 59202/1995 filed on Mar. 17, 1995 is hereby incorporated by reference.

What is claimed is:

1. A semiconductor laser device, comprising an emitting element comprising a doped diamond, said doped diamond being doped with erbium atoms (Er) and/or molecules of a chemical compound containing erbium atoms, and also being doped with nitrogen atoms (N), wherein a doping concentration of erbium in said doped diamond is in a range of from about 1 ppm to about 50,000 ppm, and a doping concentration of nitrogen in said doped diamond is not less than about 1 ppm.

2. A semiconductor laser device according to claim 1, wherein the doping concentration of nitrogen atoms in said doped diamond is in a range of from about 100 ppm to about 50,000 ppm.

3. A semiconductor laser device according to claim 1, wherein said emitting element further includes a reflecting surface for reflecting light emitted from said emitting element.

4. A semiconductor laser device according to claim 1, further comprising a structure selected from the group consisting of pn-junction structure, Schottky junction structure and metal insulator semiconductor structure, and further comprising at least one pair of electrodes.

5. A semiconductor laser device according to claim 1, wherein said doped diamond is further doped with ytterbium atoms (Yb).

6. A semiconductor laser device, comprising an emitting element comprising a doped diamond, said doped diamond being doped with erbium atoms (Er) and/or molecules of a chemical compound containing erbium atoms and also being doped with boron atoms (B), wherein a doping concentration of erbium in said doped diamond is in a range of from about 1 ppm to about 50,000 ppm, and a doping concentration of boron in said doped diamond is not less than about 1 ppm.

7. A semiconductor laser device according to claim 6, wherein the doping concentration of boron atoms in said doped diamond is in a range of from about 100 ppm to about 50,000 ppm.

8. A semiconductor laser device according to claim 6, wherein said emitting element further includes a reflecting surface for reflecting light emitted from said emitting element.

9. A semiconductor laser device according to claim 6, further comprising a structure selected from the group consisting of pn-junction structure, Schottky junction structure and metal insulator semiconductor structure, and further comprising at least one pair of electrodes.

10. A semiconductor laser device according to claim 6, wherein said doped diamond is further doped with ytterbium atoms (Yb).

11. A semiconductor laser device, comprising an emitting element comprising a doped diamond, said doped diamond being doped with erbium atoms (Er) and/or molecules of a chemical compound containing erbium atoms, and also being doped with nitrogen atoms (N) and boron atoms (B), wherein a doping concentration of erbium in said doped diamond is in a range of from about 1 ppm to about 50,000 ppm, a doping concentration of nitrogen in said doped diamond is not less than about 1 ppm, and a doping concentration of boron in said doped diamond is not less than about 1 ppm.

12. A semiconductor laser device according to claim 11, wherein the doping concentration of nitrogen atoms in said doped diamond is in a range of from about 100 ppm to about 50,000 ppm, and the doping concentration of boron atoms in said doped diamond is in a range of from about 100 ppm to about 50,000 ppm.

13. A semiconductor laser device, comprising an emitting element comprising a doped diamond, said doped diamond being doped with atoms of one rare earth metal selected from the group consisting of neodymium (Nd), samarium (Sm), europium (Eu) and ytterbium (Yb), and also being doped with nitrogen atoms (N), wherein a doping concentration of the rare earth metal in said doped diamond is in a range of from 1 ppm to about 50,000 ppm, and a doping concentration of nitrogen in said doped diamond is not less than about 1 ppm.

14. A semiconductor laser device, comprising an emitting element comprising a doped diamond, said doped diamond being doped with atoms of one rare earth metal selected from the group consisting of neodymium (Nd), samarium (Sm), europium (Eu) and ytterbium (Yb), and also being doped with boron atoms (B), wherein a doping concentration of the rare earth metal in said doped diamond is in a range of from about 1 ppm to about 50,000 ppm, and a doping concentration of boron in said doped diamond is not less than about 1 ppm.

* * * * *